United States Patent
Jia

(10) Patent No.: US 8,329,061 B2
(45) Date of Patent: Dec. 11, 2012

(54) PHOSPHORESCENT PHOSPHORS

(75) Inventor: Weiyi Jia, Chelmsford, MA (US)

(73) Assignee: Performance Indicator, LLC, Lowell, MA (US)

( * ) Notice: Subject to any disclaimer, the term of this patent is extended or adjusted under 35 U.S.C. 154(b) by 574 days.

(21) Appl. No.: 12/503,211

(22) Filed: Jul. 15, 2009

(65) Prior Publication Data

US 2011/0012059 A1    Jan. 20, 2011

(51) Int. Cl.
*C09K 11/08* (2006.01)
*C09K 11/61* (2006.01)
*C09K 11/02* (2006.01)
*C09K 11/77* (2006.01)

(52) U.S. Cl. .................. 252/301.4 H; 252/301.4 R

(58) Field of Classification Search ........... 252/301.4 R, 252/301.4 H
See application file for complete search history.

(56) References Cited

U.S. PATENT DOCUMENTS

| | | | |
|---|---|---|---|
| 5,424,006 A | 6/1995 | Murayama et al. | |
| 5,686,022 A | 11/1997 | Murayama et al. | |
| 6,953,536 B2 | 10/2005 | Yen et al. | |
| 2008/0277624 A1 | 11/2008 | Beladakere | |
| 2009/0095940 A1 | 4/2009 | Meltzer et al. | |

FOREIGN PATENT DOCUMENTS

| AU | WO2007/048201 | * | 5/2007 |
|---|---|---|---|
| JP | 2001131544 A | | 5/2001 |

OTHER PUBLICATIONS

Annex to Form PCT/ISA/206 dated Sep. 23, 2010 for PCT/US10/42102. Applicant: Performance Indicator LLC.

* cited by examiner

*Primary Examiner* — Carol M Koslow
*Assistant Examiner* — Matthew Hoban
(74) *Attorney, Agent, or Firm* — Elissa M. Kingsland

(57) ABSTRACT

Photoluminescent phosphors wherein some of the oxygen anions in the phosphor matrix have been replaced by halides or nitride. In addition, photoluminescent phosphors wherein some of the oxygen anions in the phosphor matrix have been replaced by halides or nitride and a charge compensator has been included. The phosphors are based on green emitting and blue-green emitting aluminates.

5 Claims, 12 Drawing Sheets

PHOSPHORESCENT PHOSPHORS

FIELD OF INVENTION

The present invention relates generally to photoluminescent phosphors, and more particularly to novel photoluminescent phosphors wherein some of the oxygen anions in the phosphor matrix have been replaced by halides or nitride. The invention also relates to novel photoluminescent phosphors wherein some of the oxygen anions in the phosphor matrix have been replaced by halides and a charge compensator has been included. The phosphors exhibit improved optical properties compared to conventional phosphors.

BACKGROUND OF THE INVENTION

Persistent phosphorescent materials are known and are commercially available. For example, metal sulfide pigments which contain various elemental activators, co-activators and compensators are available, including CaS:Bi, which emits violet blue light; CaSrS:Bi, which emits blue light; ZnS:Cu, Co which emits green light; and (ZnCd)S:Cu,Co which emits yellow or orange light.

Metal aluminate phosphorescent pigments, particularly alkaline earth aluminate oxides having the formula $MAl_2O_4$, where M is an alkaline earth metal or mixture of metals, are also available. These aluminate phosphorescent materials exhibit afterglow characteristics that last much longer in duration than do those of metal sulfide materials. Europium was incorporated into the strontium aluminate matrix which serves as an emitter. The afterglow became stronger if less SrO was used during the synthesis of $SrAl_2O_4:Eu^{2+}$ resulting from formation of trapping centers associated with the $Sr^{2+}$ vacancy.

The brightness and persistence time of $SrAl_2O_4:Eu^{2+}$ was further improved by co-doping one or more co-activators into the strontium aluminate matrix using such elements as those of the Lanthanide series (e.g. lanthanum, cerium, praseodymium, neodymium, samarium, gadolinium, terbium, dysprosium, holmium, erbium, thulium, ytterbium, and lutetium), tin, manganese, yttrium, or bismuth. The best result was obtained by co-doping $Dy^{3+}$ with $Eu^{2+}$ into $SrAl_2O_4$ and $Nd^{3+}$ with $Eu^{2+}$ into $CaAl_2O_4$ to get long persistent green and purple emission, respectively, see U.S. Pat. Nos. 5,424,006 and 5,686,022 both to Murayama.

In addition, persistent blue-green phosphorescent materials have also been disclosed wherein metallic cationic species have been substituted in the alkaline earth aluminate oxides having the formula $MO.mAl_2O_3:Eu^{2+}$, $R^{3+}$ wherein m is a number ranging from 1.6 to about 2.2, M is strontium or a combination of strontium and calcium and/or barium, $Eu^{2+}$ is an activator, and R is one or more trivalent rare earth materials of the lanthanide series (e.g. lanthanum, cerium, praseodymium, neodymium, samarium, gadolinium, terbium, dysprosium, holmium, erbium, thulium, ytterbium, lutetium), yttrium or bismuth co-activators.

Cationic replacement of a portion of the $Al^{3+}$ in the alkaline earth aluminum oxide matrix by divalent cations such as $Mg^{2+}$ or $Zn^{2+}$ has been reported in addition to replacing a portion of the alkaline earth metal ion ($M^{2+}$) with a monovalent alkali metal ion such as $Li^+$ or $Na^+$.

Fluorides have been used in the manufacture of photoluminescent phosphors either as a flux material or to treat the surface of the phosphor crystals to provide improved moisture resistance as described in US Patent App. 2008/0277624A1.

As can be seen from the above examples, most work has been performed so as to improve the phosphorescence intensity and long-term persistence of the phosphors involving alterations in the cationic species, the amounts of the cations and ratios between them. Little attention has been paid to improvements in charging rates wherein the phosphor can be rapidly charged in low light environments and/or from weak activation sources. Also, very little investigation has been done on the replacement of the anionic, negatively charged oxygen ions in the phosphor matrix and the impact of such replacement on the luminescent properties of such a phosphor, such as, for example, intensity, persistence and charging rate.

Thus there is a need to investigate materials with improved charging rates as well as a need to investigate replacement of the anionic ions in phosphor matrices.

SUMMARY OF THE INVENTION

The present invention provides for novel persistent phosphors based on alkaline earth aluminate matrices, wherein some of the oxygen anions in the phosphor matrix have been replaced by halides or nitride. These phosphors exhibit significantly higher charging rates and, in some compositions, exhibit higher emission intensity than conventional phosphors. The invention also provides for novel persistent phosphors based on alkaline earth aluminate matrices, wherein some of the oxygen anions in the phosphor matrix have been replaced by halides and a charge compensator such as magnesium, zinc or nitride has been included. These phosphors not only exhibit significantly higher charging rates than conventional phosphors but they maintain their high intensity and persistence.

In the current invention fluoride, chloride or nitride anions are incorporated into the matrix of alkaline earth aluminate-based phosphors during the synthetic process, replacing some of the oxygen atoms that would normally be there. Such anion incorporation can be used to tailor crystalline electric field, defect structures in the matrix and crystal structure of the matrix, thus, altering the luminescent properties of the phosphors made therefrom. In the current invention some of the oxygen in the alkaline earth aluminate phosphors was replaced with other anions both by balancing the number of anions in the matrix as well as providing an excess of anions in the matrix.

It is believed that defects in the persistent phosphors may sometimes play either positive or negative role in the phosphorescent behavior of the novel phosphors. Charge compensators, such as magnesium, zinc or nitride, are used in this invention to balance charge defects in the matrix thereby eliminating or reducing the deleterious effects of the charge defects when they occur.

Figure 4:
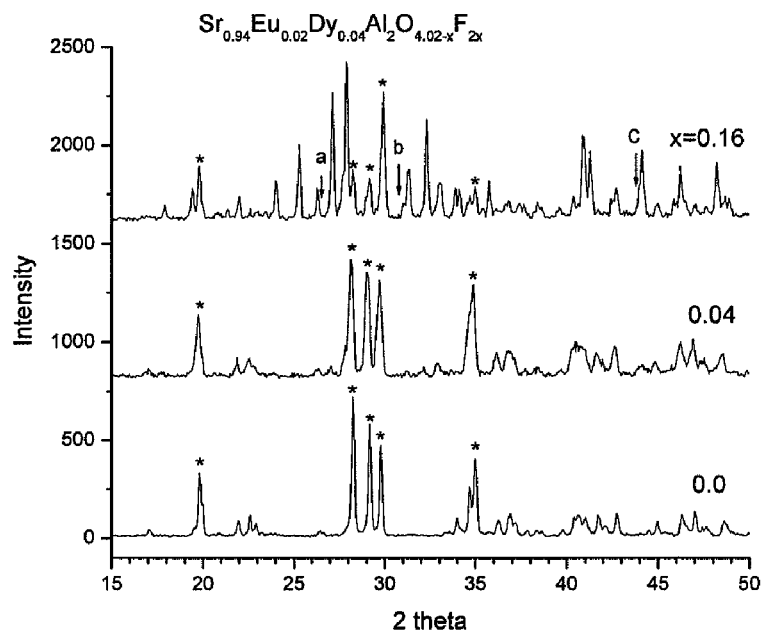

FIG. 4 is a graph showing the X-ray diffraction patterns of $Sr_{0.94}Eu_{0.02}Dy_{0.04}Al_2O_{4.02-x}F_{2x}$ with x=0.0, 0.04 and 0.16. Adding $SrF_2$ modifies the crystal structure. When x=0.16, the crystal structure is possibly changed to triclinic from monoclinic. The relative intensities of diffraction peaks (peaks with *) of the $SrAl_2O_4$ phase are dramatically changed.

Figure 5:
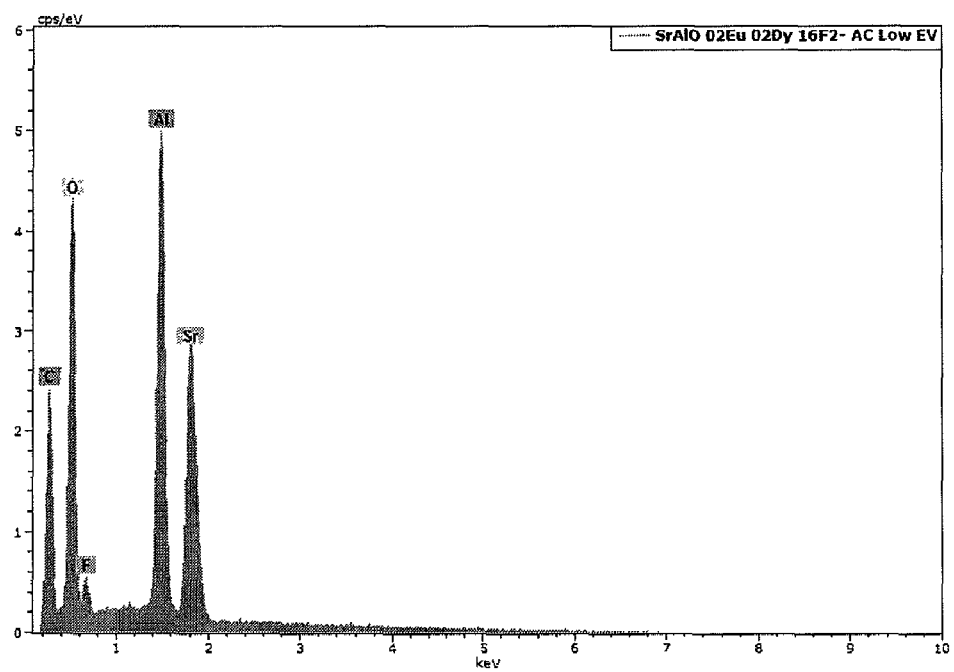

FIG. 5 is an energy dispersion spectrum of $Sr_{0.94}Eu_{0.02}Dy_{0.04}Al_2O_{3.86}F_{0.32}$, showing existence of fluorine ions.

Figure 6:
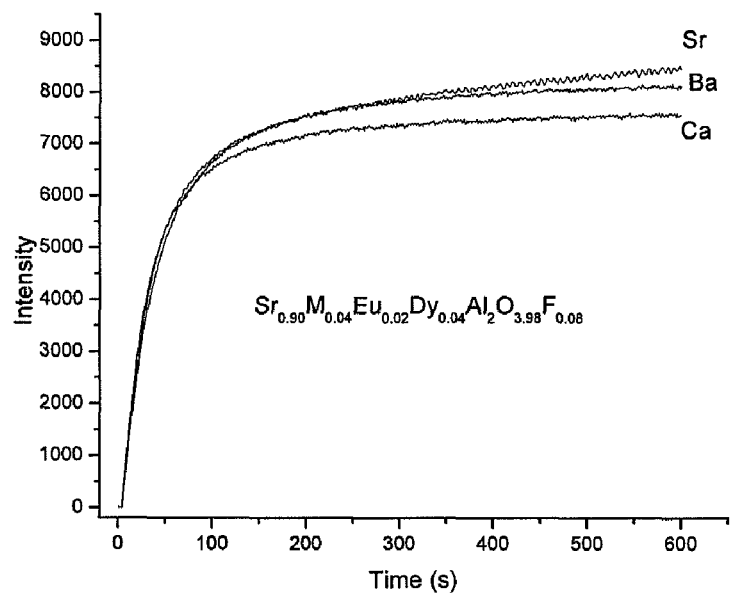

FIG. 6 is a graph showing the charging rates of $Sr_{0.90}M_{0.04}Eu_{0.02}Dy_{0.04}Al_2O_{3.98}F_{0.08}$ with M=Ca, Sr and Ba showing the minimal effect that the inclusion of different cations has on the charging curve.

Figure 7:
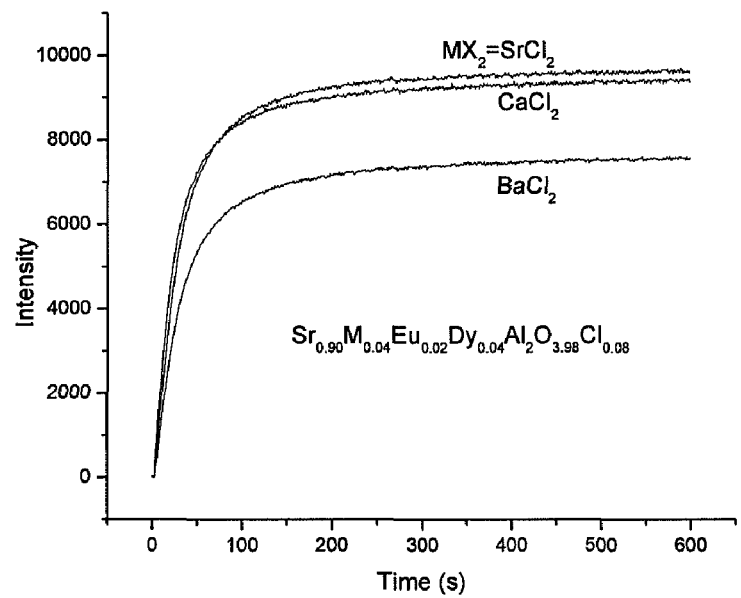

FIG. 7 is a graph showing the charging rates of $Sr_{0.90}M_{0.04}Eu_{0.02}Dy_{0.04}Al_2O_{3.98}Cl_{0.08}$ with M=Ca, Sr, or Ba. The chloride containing phosphors exhibit high charging rates.

Figure 8:
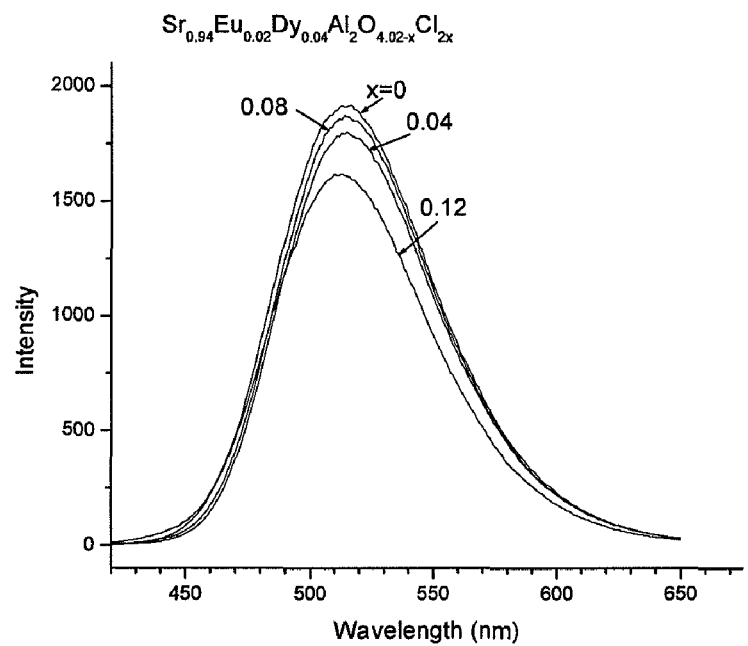

FIG. 8 is a graph showing the emission spectra of $Sr_{0.94}Eu_{0.02}Dy_{0.04}Al_2O_{4.02-x}Cl_{2x}$, with x=0, 0.04, 0.08 and 0.12. Note that the emission intensity decreases with increased chloride content.

Figure 9:
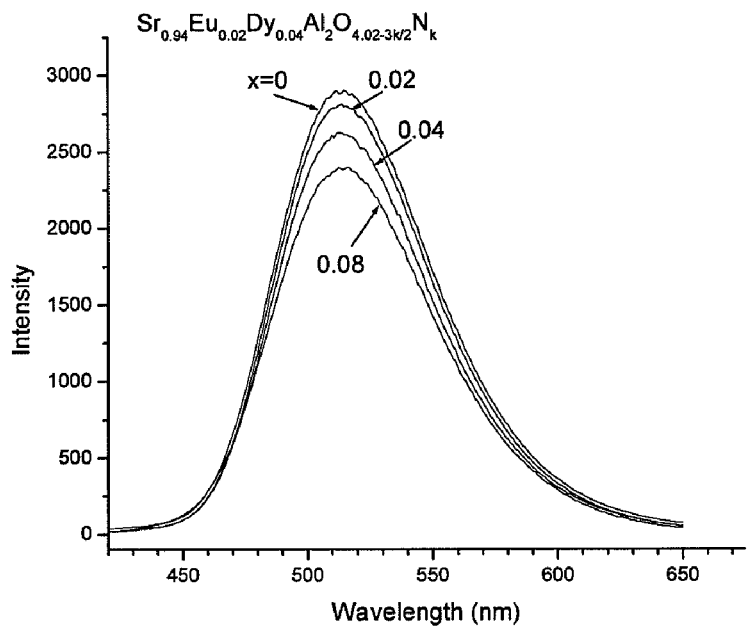

FIG. 9 is a graph showing the emission spectra of $Sr_{0.94}Eu_{0.02}Dy_{0.04}Al_2O_{4.02-3k/2}N_k$, with k=0.00, 0.02, 0.04 and 0.08. The emission intensity decreases with increased amounts of nitride.

Figure 10:
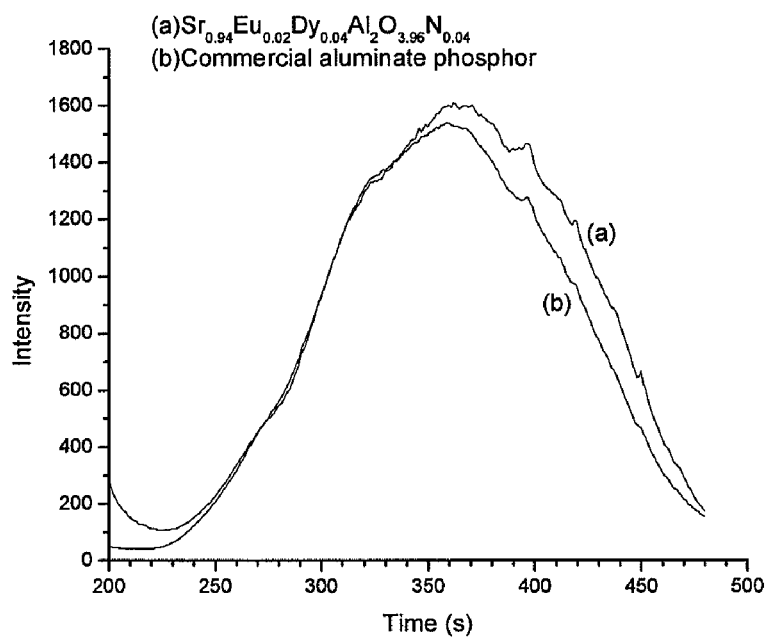

FIG. 10 is a graph showing the excitation spectra of $Sr_{0.94}Eu_{0.02}Dy_{0.04}Al_2O_{3.96}N_{0.04}$ and commercial aluminate phosphor. Above about 350 nm the excitation intensity increases.

Figure 11:
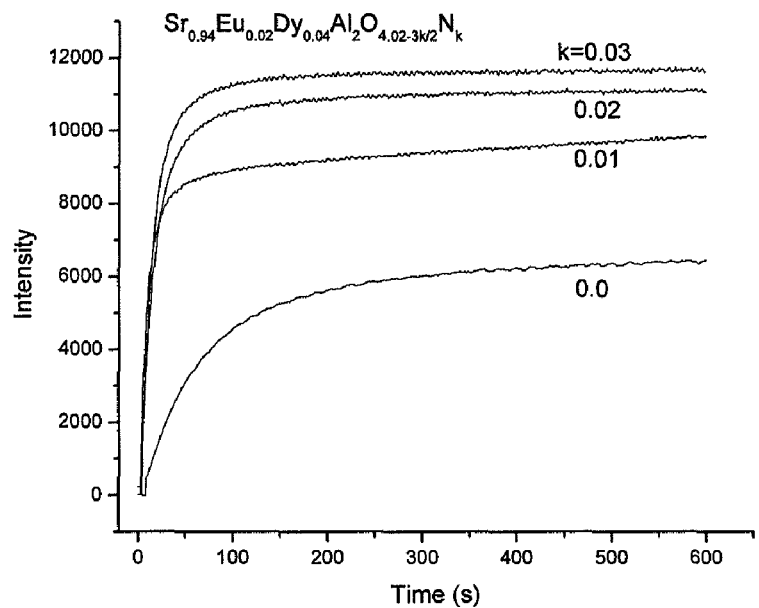

FIG. 11 is a graph showing the charging rates of $Sr_{0.94}Eu_{0.02}Dy_{0.04}Al_2O_{4.02-3k/2}N_k$ with k=0.01, 0.02 and 0.04 compared to a non-nitride phosphor wherein k=0.0 showing that increases in nitride content gives increases in charging rates.

Figure 12:
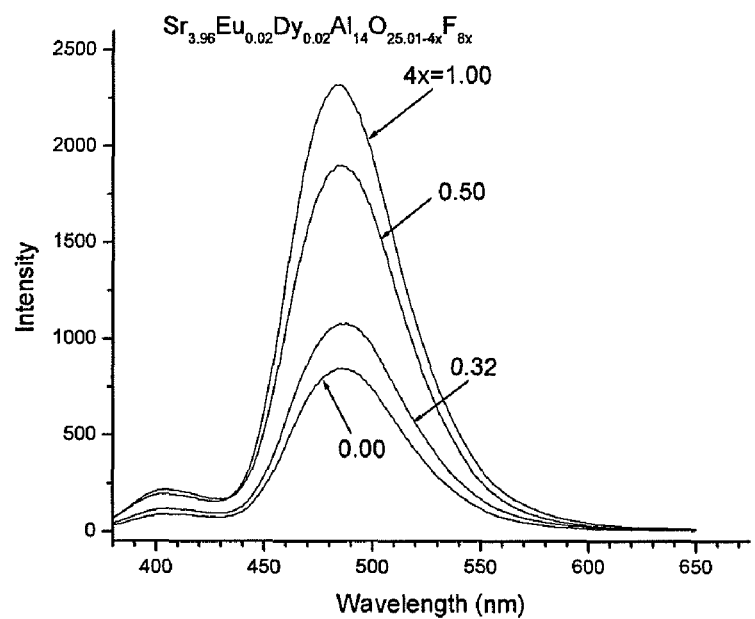

FIG. 12 is a graph showing the emission spectra of the blue-green emitting phosphor, $Sr_{3.96}Eu_{0.02}Dy_{0.02}Al_{14}O_{25.01-4x}F_{8x}$ with 4x=0, 0.32, 0.50, and 1.00. The emission intensity increases with increased fluoride.

Figure 13:
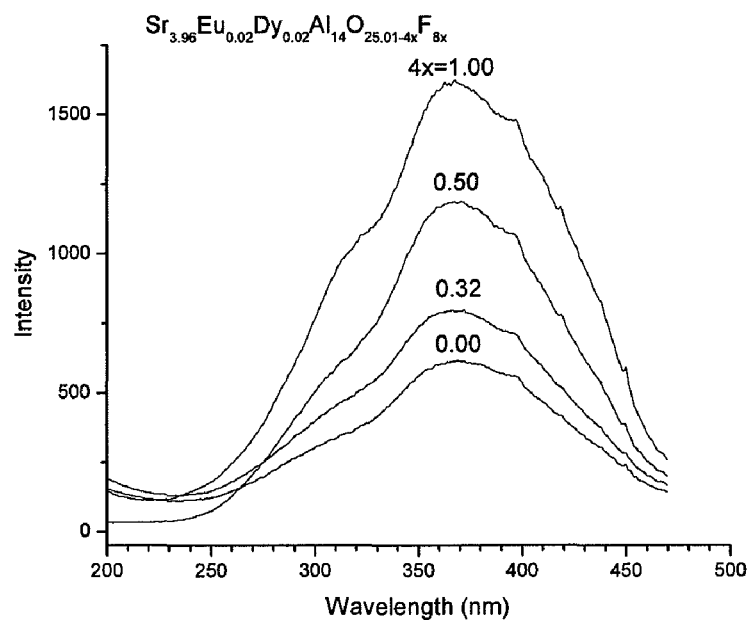

FIG. 13 is a graph showing the excitation spectra of $Sr_{3.96}Eu_{0.02}Dy_{0.02}Al_{14}O_{25.01-4x}F_{8x}$ with 4x=0, 0.32, 0.50, and 1.00. As the fluoride content increases, the absorption intensity increases.

Figure 14:
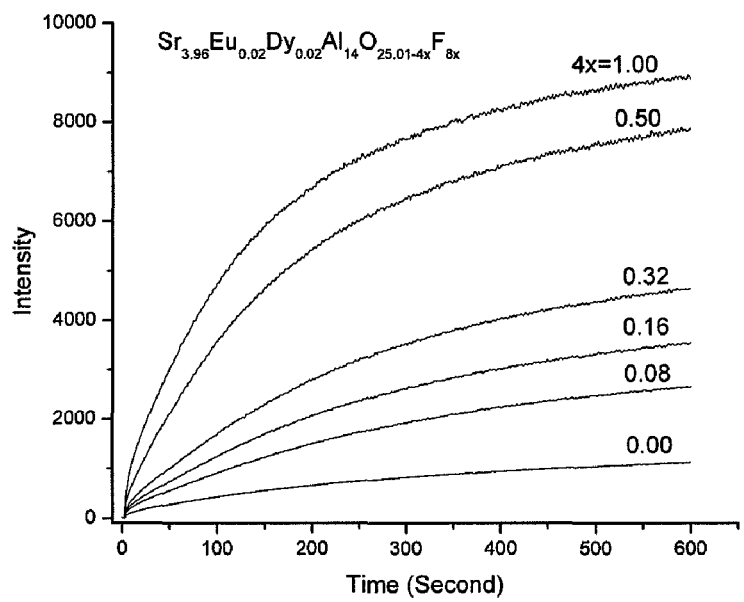

FIG. 14 is a graph showing the charging rates of $Sr_{3.96}Eu_{0.02}Dy_{0.02}Al_{14}O_{25.01-4x}F_{8x}$ with 4x=0.0, 0.08, 0.16, 0.32, 0.50 and 1.00. As the fluoride content increases the charging rates increase.

Figure 15:
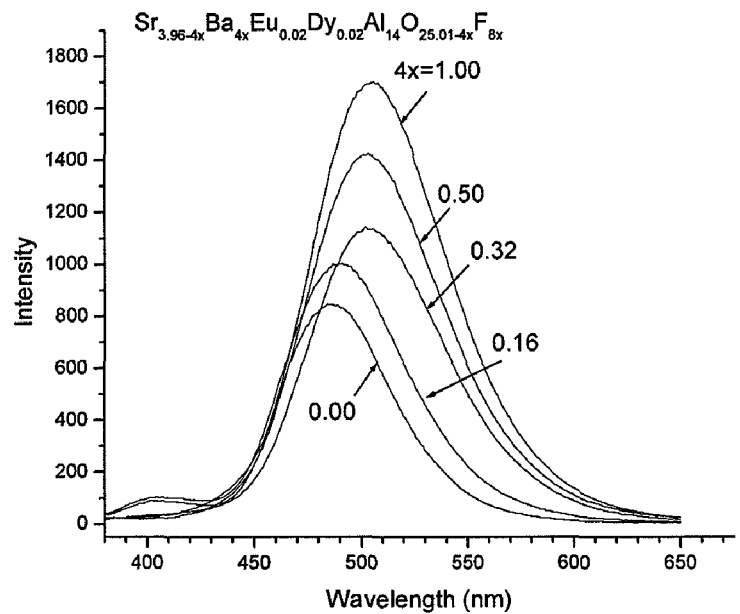

FIG. 15 is a graph showing the emission spectra of $Sr_{3.96-4x}Ba_{4x}Eu_{0.02}Dy_{0.02}Al_{14}O_{25.01-4x}F_{8x}$ with 4x=0, 0.16, 0.32, 0.50 and 1.00. With increased fluoride content the emission intensity increases. When 4x>0.32 the emission peak maximum moves from 490 nm to 510 nm, and the deep blue peak at 410 nm disappeared. This is an indication of change in the crystal structure.

Figure 16:
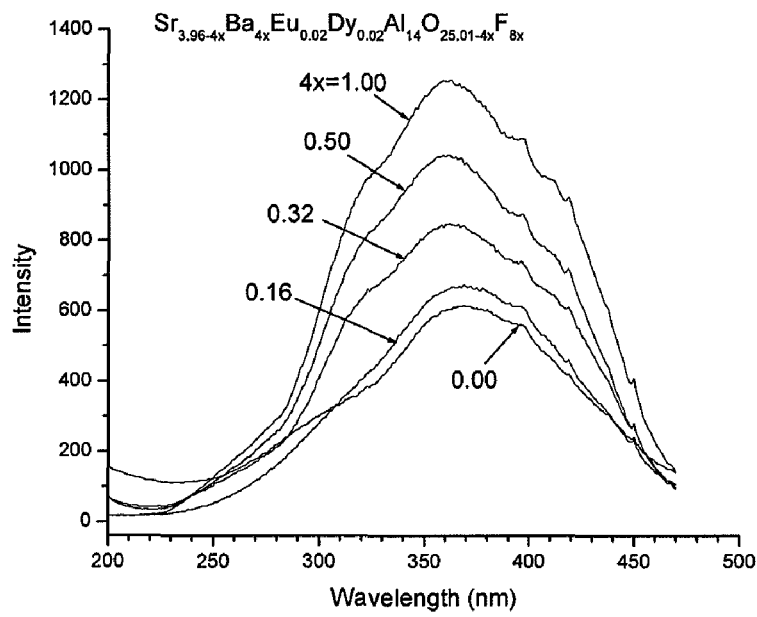

FIG. 16 is a graph showing the excitation spectra of $Sr_{3.96-4x}Ba_{4x}Eu_{0.02}Dy_{0.02}Al_{14}O_{25.01-4x}F_{8x}$ with 4x=0, 0.16, 0.32, 0.50, and 1.00. As the fluoride content increases, the absorption intensity also increases.

Figure 17:
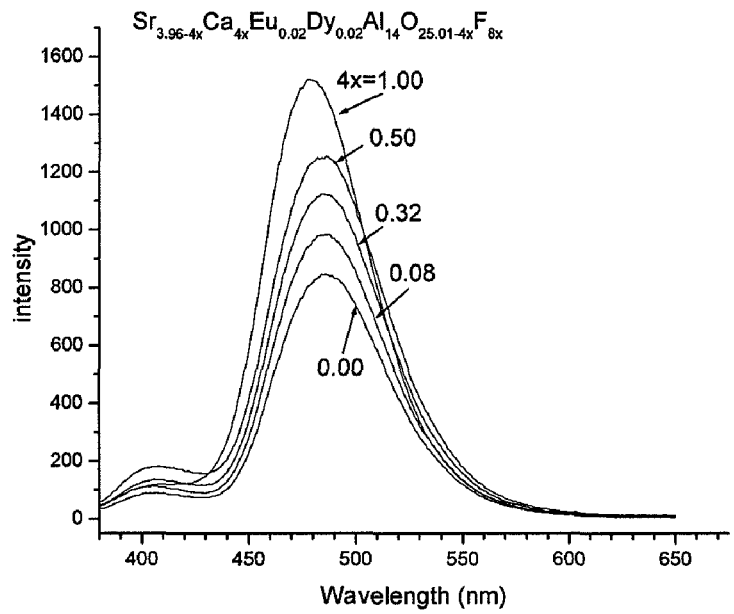

FIG. 17 is a graph showing the emission spectra of $Sr_{3.96-4x}Ca_{4x}Eu_{0.02}Dy_{0.02}Al_{14}O_{25.01-4x}F_{8x}$ with 4x=0, 0.08, 0.32, 0.50 and 1.00. As the fluoride content increases, the emission intensity also increases. A slight blue shift of the emission band with increasing 4x is shown.

Figure 18:
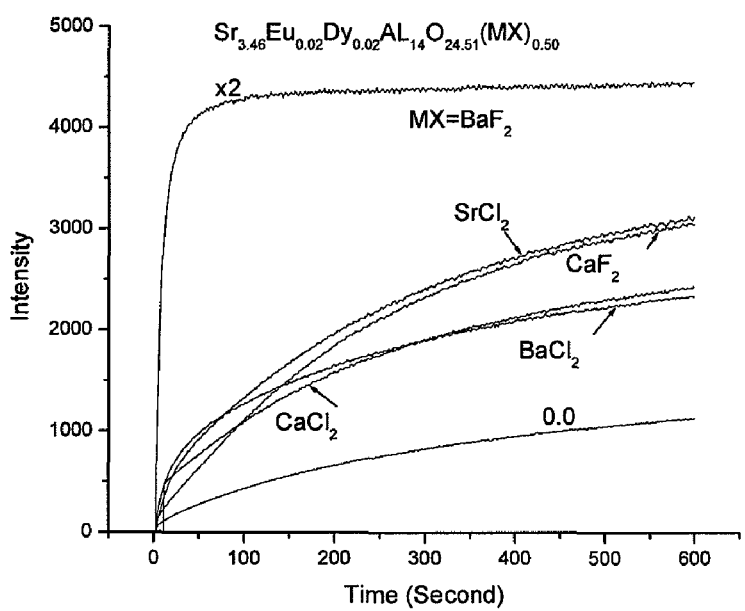

FIG. 18 is a graph showing the charging rates of $Sr_{3.46}Eu_{0.02}Dy_{0.02}Al_{14}O_{24.51}(MX)_{0.50}$ with $MX_2$=0.0, $BaF_2$, $CaF_2$, $SrCl_2$, $BaCl_2$ and $CaCl_2$.

Figure 19:
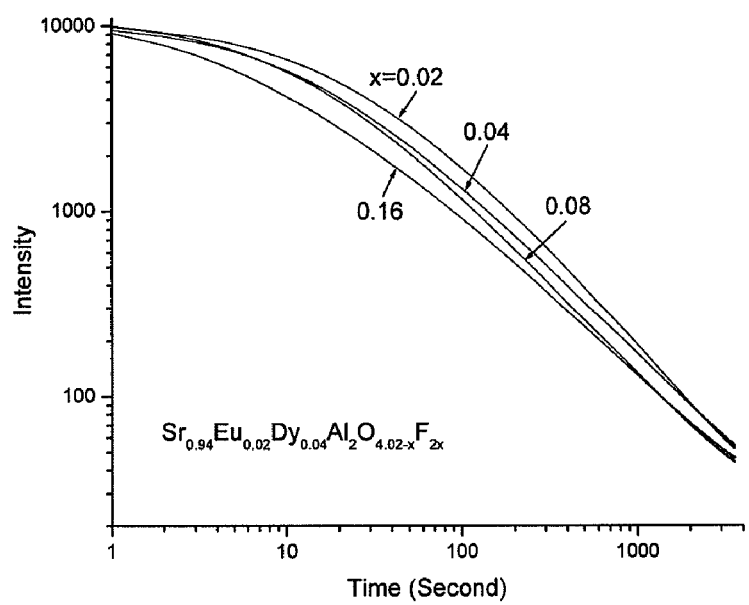

FIG. 19 is a graph showing the decay rate of $Sr_{0.94}Eu_{0.02}Dy_{0.04}Al_2O_4O_{4.02-x}F_{2x}$ with x=0.02, 0.04, 0.08, and 0.16. By increasing the content of $SrF_2$ the decay rate is somewhat faster.

Figure 20:
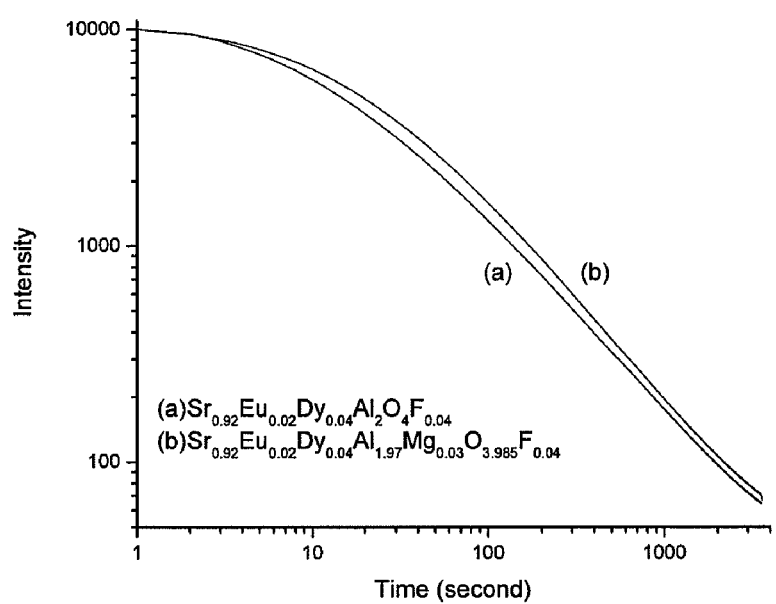

FIG. 20 is a graph showing the decay rate of $Sr_{0.92}Eu_{0.02}Dy_{0.04}Al_{2-k}Mg_kO_{4-k/2}F_{0.04}$ with k=0.00 and 0.03. The decay rate of the afterglow is decreased by incorporating Mg to balance the charge defects.

Figure 21:
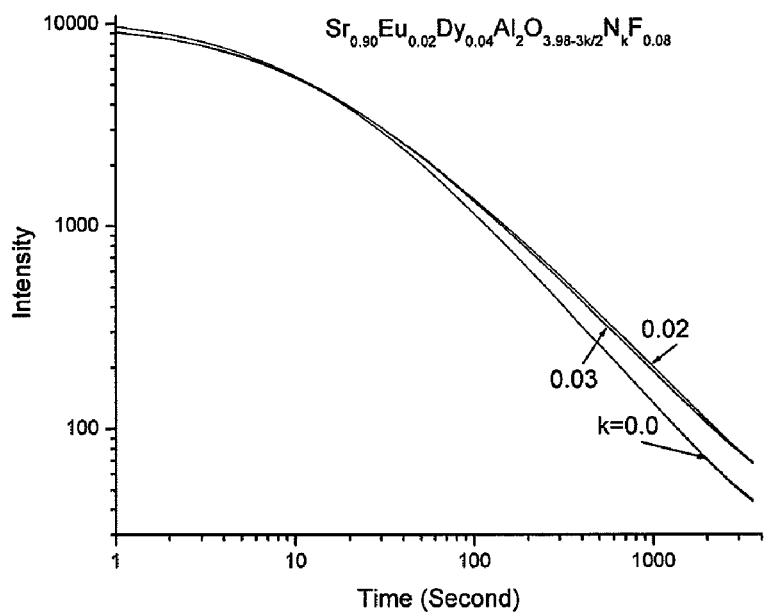

FIG. 21 is a graph showing the decay rate of $Sr_{0.90}Eu_{0.02}Dy_{0.04}Al_2O_{3.98-3k/2}N_kF_{0.08}$ with k=0.00, 0.02, and 0.03. The decay rate is decreased by incorporation of nitride (AlN) to balance the charge defects.

Figure 22:
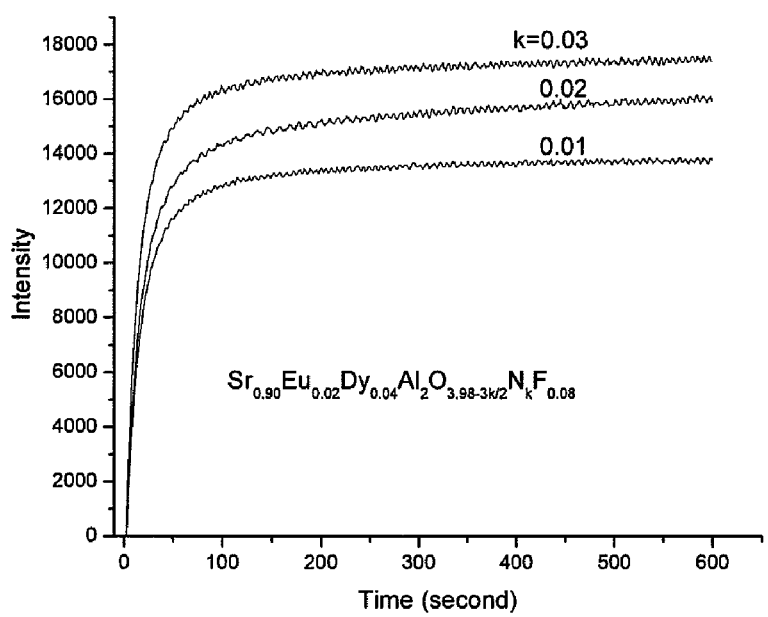

FIG. 22 is a graph showing the charging rates of $Sr_{0.90}Eu_{0.02}Dy_{0.04}Al_2O_{3.98-3k/2}N_kF_{0.08}$ with k=0.01, 0.02 and 0.03. It can be seen that the charging rates are much higher than the samples with AlN only.

Figure 23:
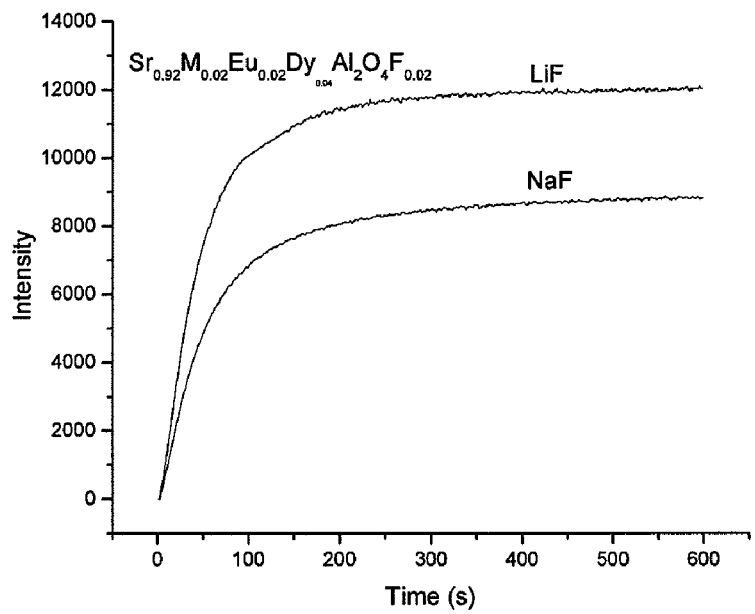

FIG. 23 is a graph showing the charging rates of $Sr_{0.92}M_{0.02}Eu_{0.02}Dy_{0.04}Al_2O_4F_{0.02}$, M=Li and Na. The charging rates are increased with incorporation of fluoride using monovalent salts in the synthesis.

Figure 24:
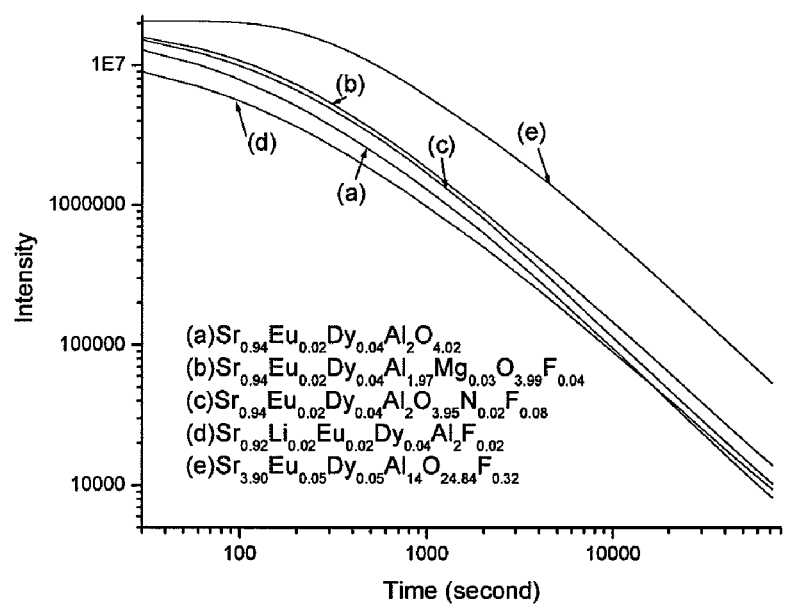

FIG. 24 is a graph showing the decay rates of $Sr_{0.92}Li_{0.02}Eu_{0.02}Dy_{0.04}Al_2O_4F_{0.02}$(d) along with the decay rates of $Sr_{0.94}Eu_{0.02}Dy_{0.04}Al_{1.97}Mg_{0.03}O_{3.985}F_{0.04}$(b); $Sr_{0.94}Eu_{0.02}Dy_{0.04}Al_2O_{3.95}N_{0.02}F_{0.08}$(c); $Sr_{0.94}Eu_{0.02}Dy_{0.04}Al_2O_{4.02}$(a); and $Sr_{3.90}Eu_{0.05}Dy_{0.05}Al_{14}O_{24.84}F_{0.32}$(e). The phosphors with charge compensators show decreased decay rates. The lithium fluoride containing phosphor shows an increased decay rate while the blue green phosphor has a very low decay rate.

DETAILED DESCRIPTION OF THE INVENTION

A new approach to engineering the unit cell of persistent phosphors provides for phosphors with improved photoluminescent properties. This approach involves replacing some of the oxygen anions in alkaline earth aluminate phosphors with halides or nitride. This is accomplished during the synthesis of the aluminate phosphor. The novel phosphors exhibit significantly higher charging rates and, in some compositions, exhibit significantly higher emission intensity than commercial strontium aluminate phosphors.

The novel approach also involves including a charge compensator, such as magnesium or zinc, in the aluminate matrix along with the halide or nitride replacement. Charge compensators aid in reducing or eliminating charge defects that may occur when oxides are substituted for other atoms in the aluminate matrix. The novel approach includes combining halides and nitride together to replace some of the oxide in the phosphor matrix. In this combination, charge defects are reduced or eliminated.

The photoluminescent phosphor matrices useful in the current include, for example, the rare earth element doped aluminates, such as the green emitting phosphor, $SrAl_2O_4$:Eu, Dy, and the blue-green phosphors, $SrAl_4O_7$:Eu,Dy and $Sr_4Al_{14}O_{25}$:Eu,Dy. The different matrices are obtained by formulating the ingredients in their specific ratios during the synthesis process. For example, the molar ration between the aluminate and strontium starting materials is higher for synthesizing the blue-green phosphors.

As used herein, a "photoluminescent" material is a material capable of emitting electromagnetic radiation from electronically-excited states when excited or charged or activated by electromagnetic radiation.

As used herein "persistence" is defined as the time it takes, after discontinuing irradiation, for photoluminescent emissions emanating from a photoluminescent object to decrease to the threshold detectability with a suitable detection apparatus.

As used herein "emission intensity" is defined as a measure of the photoluminescent emissions from a photoluminescent object, such measurement being made with any device capable of measuring the emission strength either photometrically or radiometrically, such emissions being either visible or infrared or both.

As used herein, a "charging rate" is the speed with which a photoluminescent material reaches its maximum level of emission when activating electromagnetic radiation is applied.

As used herein, a "decay rate" is the speed with which a photoluminescent material emits electromagnetic radiation to reach a minimal level after an activating source has been removed.

As used herein, the term "charge defects" refers to defects in the crystalline matrix of a phosphor as a result of replacement one atom for another in the matrix that is not an exact size match, which results in altered photoluminescent characteristics.

As used herein the term "charge compensator" refers to a material added to a phosphor matrix that has charge defects which help to adjust the size discrepancies in the matrix.

Since fluorine, oxygen and nitrogen ions are isoelectronic, their ionic radii are relatively similar, within a few tenths of an angstrom. While not being held to theory it is believed that they are readily interchangeable. Thus, it was found that some of the oxide could be replaced with fluoride or nitride in the aluminate matrix of strontium aluminate phosphors. As a result the luminescent properties of the phosphors can be greatly modified. Fluoride can readily replace some of the oxide in the green-emitting, strontium aluminates doped with europium and dysprosium to give new phosphors that can be represented by the Formula I. It should be noted that the amount of fluoride in the formulae listed below is between 0.00001 and 0.4. Amounts of fluoride greater than about 0.4 result in large amounts of interstitial defects which increase the quenching of the luminescence of the phosphor to an unsuitable level. After charging the phosphor, the emission wavelength was found to be shifted toward the blue region of the electromagnetic spectrum.

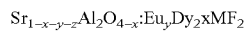

$$Sr_{1-x-y-z}Al_2O_{4-x}:Eu_yDy_zxMF_2 \qquad \text{Formula I}$$

wherein $M=Sr^{2+}$, $C^{2+}$, $Ba^{2+}$ x is between about 0.00001 and about 0.4 y is between about 0.00001 and about 0.2 z is between about 0.00001 and about 0.4

Figure 1:
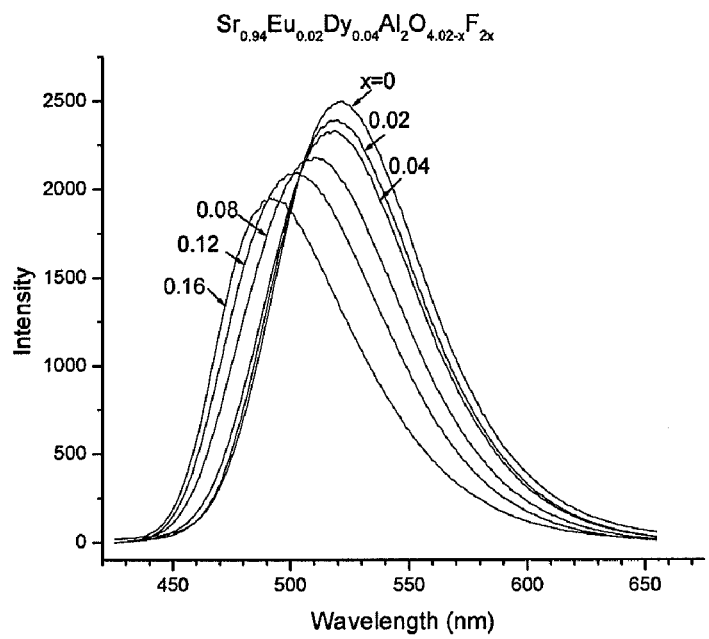
FIG. 1 is a graph showing the emission spectra of $Sr_{0.94}Eu_{0.02}Dy_{0.04}Al_2O_{4.02-x}F_{2x}$, with x=0, 0.02, 0.04, 0.08, 0.12 and 0.16. The emission wavelength shifts to shorter wavelength with increasing fluoride.

With increasing amounts of fluoride, large shifts in the emission were found, see FIG. 1, wherein $M=Sr^{2+}$ and y=0.02. Without any fluoride in the phosphor matrix, i.e. x=0.00 in Formula I, the peak emission was at 520 nm, while when x=0.16 in Formula I, the peak emission shifted to 490 nm. This equates to a shift of 18.8 nm per 0.1 mole of $SrF_2$, which was used in the preparation of the novel phosphors as shown below. As a comparison, replacement of cations exhibits a much reduced shift in the emission spectrum. For example, replacing strontium for barium in $SrAl_2O_{4.02}$:Eu,Dy to give $BaAl_2O_4$:Eu,Dy, a shift from 520 nm to 505 nm occurred, respectively. This equates to a shift of 1.5 nm per 0.1 mole of Ba. As can be seen from this data, incorporating small amounts of fluoride into the aluminate matrix provides for large shifts in peak emissions toward the blue region of the electromagnetic spectrum. Additionally, in the blue-green phosphor, $Sr_4Al_{14}O_{25.01}$:Eu,Dy,1.20$SrF_2$, a shift from 490 nm to 480 nm was observed compared to the non-fluoride containing phosphor, respectively.

Figure 2:
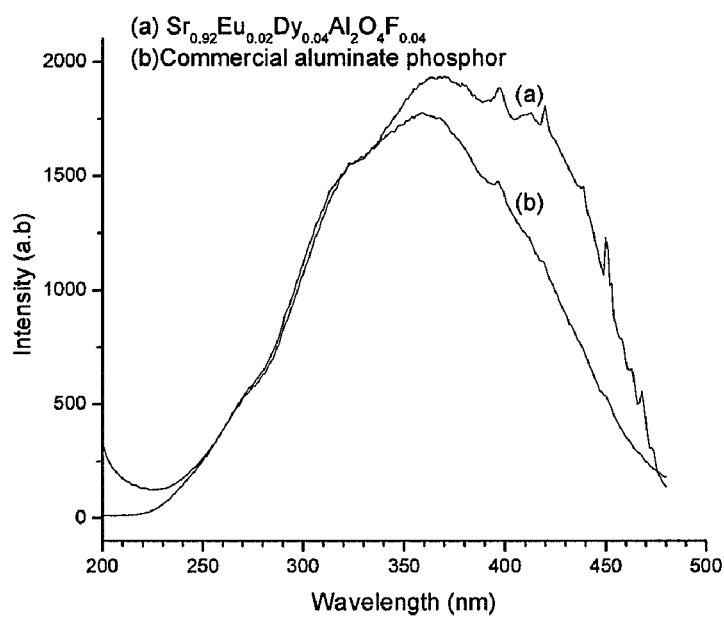
FIG. 2 is a graph showing the excitation spectrum of $Sr_{0.92}Eu_{0.02}Dy_{0.04}Al_2O_4F_{0.04}$, compared with that of commercial strontium aluminate phosphor without fluoride. Stronger absorption at $\lambda > 340$ nm is shown for the fluoride-containing sample.

The absorption peak of the phosphor represented by Formula I, wherein M=Sr and y=0.02, is shifted toward longer wavelengths, that is, toward the red region of the electromagnetic spectrum, see FIG. 2. Compared to a commercial strontium aluminate phosphor co-doped with dysprosium and europium, the fluoride containing strontium aluminate of the current invention exhibits a stronger absorbance at wavelengths longer than 340 nm. The results indicate that the photo excitation is more efficient and, as a result, the photo charging rate is higher in the fluoride-containing phosphor matrix compared to the non-fluoride-containing phosphor matrix.

Figure 3:
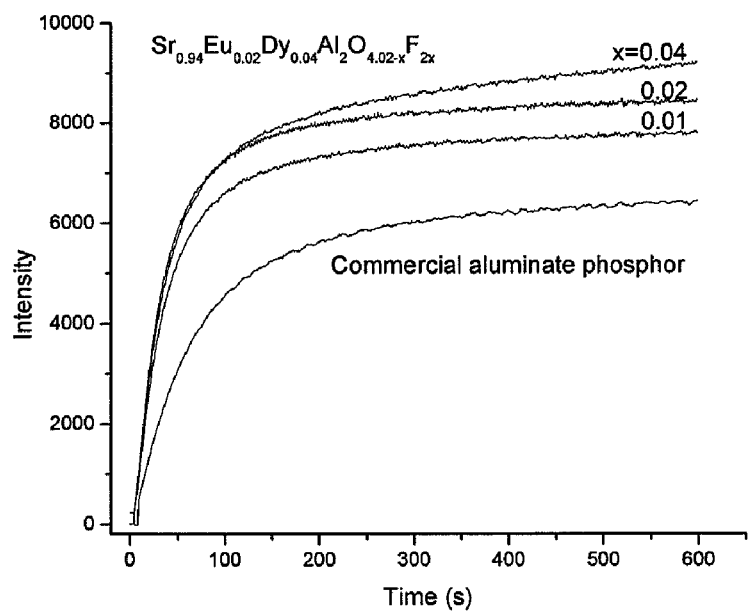
FIG. 3 is a graph showing the charging rates of $Sr_{0.94}Eu_{0.02}Dy_{0.04}Al_2O_{4.02-x}F_{2x}$ with x=0.01, 0.02 and 0.04 compared to a commercial strontium aluminate phosphor without fluoride. As the amount of fluoride increases, the charging rate increases.

The charging rate of these phosphors increases rapidly with increasing amounts of fluoride, see FIG. 3 wherein M=Sr, y=0.02 and z=0.04. (All charging rate experiments were performed by pre-discharging the phosphors overnight (18 hours) to reduce most of the residual phosphorescence. They were then charged with 365 nm light using a Xe lamp in a Hitachi spectrofluorometer F7000 with an exit slit of 1 nm and measured with an entrance slit of 10 nm using the spectrofluorometer). As can be seen from FIG. 3, the charging rates of the fluoride-containing phosphors are higher than a commercial non-fluoride containing strontium aluminate co-doped with dysprosium and europium. When higher amounts of fluoride were incorporated into the matrix, the rate of charging was higher.

Incorporation of fluoride into the aluminate phosphor has an effect on the crystal structure of the matrix as depicted in the x-ray diffraction patterns shown in FIG. 4. As can be seen in FIG. 4, when x=0.16 and M=Sr in phosphors, as depicted in Formula I, the relative intensity of the diffraction peaks of the novel strontium aluminate matrix, labeled with *, are dramatically changed compared to a phosphor without fluoride incorporation and many new peaks appear. This indicates a change in crystalline structure. The arrows with intensities at a=212, b=428 and c=1643 point to the locations on the graph where peaks from $SrF_2$ would be located if $SrF_2$ were present as a separate phase in the crystal but not incorporated into the aluminate matrix. As can be seen there are no such peaks at these positions. Thus, since there is no extra phase relating to $SrF_2$, it is determined that $F^-$ has been incorporated into the aluminate matrix replacing some of the oxygen and thereby altering the crystal structure.

The existence of fluoride ions in the matrix of the novel phosphors is further confirmed by energy dispersion spectra (EDS) as shown in FIG. 5. The spectrum clearly shows a peak for fluorine at approximately 0.65 keV.

The charging rates of phosphors, which were prepared using $CaF_2$ or $BaF_2$ in place of $SrF_2$ (Formula I, M=Ca or Ba), are also increased compared to commercial non-fluoride-containing strontium aluminates co-doped with europium and dysprosium, as shown in FIG. 6, indicating that the cations that are brought into the phosphor during synthesis have little effect on the charging rate of the phosphor.

Replacing some of the oxygen in strontium aluminate phosphors doped with europium and dysprosium with chloride anions gives new phosphors that can be represented by Formula II.

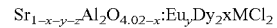

$$Sr_{1-x-y-z}Al_2O_{4.02-x}:Eu_yDy_zxMCl_2 \qquad \text{Formula II}$$

wherein $M=Sr^{2+}$, $Ca^{2+}$, $Ba^{2+}$ x is between about 0.00001 and about 0.5 y is between about 0.00001 and about 0.2 z is between about 0.00001 and about 0.2

The ionic radius of Cl⁻ is 1.81 Å which is much larger than oxygen. This may affect the solubility of chloride ions in the matrix and thus be incorporated. The ionic distribution of chloride into the interstices of the matrix may be different from the fluoride-containing phosphors, for example, two chloride ions may not be allowed to reside too close to each other in the matrix. Despite these impediments, it is believed that chloride anions replaced some of the oxide ions in the phosphor matrix. As such, the charging rate of the chloride-containing phosphors is higher than commercial non-chloride-containing strontium aluminate phosphor co-doped with dysprosium and europium, as shown in FIG. 7. Note that when incorporating chloride into the matrix, by using strontium or calcium chloride in the synthesis, the charging rate is higher than when barium chloride is used. Additionally there is a slight shift to shorter wavelengths in the emission spectra when the highest amount of chloride is used and the emission intensity decreases as the amounts of chloride are increased in the matrix, see FIG. 8.

Nitride can also be used to modify the phosphor matrix. Incorporation of nitride into strontium aluminates doped with europium and dysprosium to replace a portion of the oxide gives new phosphors that can be represented by the Formula III, using AlN to incorporate the nitride.

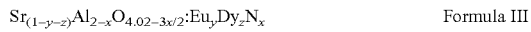

$$Sr_{(1-y-z)}Al_{2-x}O_{4.02-3x/2}:Eu_yDy_zN_x \qquad \text{Formula III}$$

wherein x is between about 0.00001 and about 0.5
y is between about 0.00001 and about 0.2
z is between about 0.00001 and about 0.2

The peak emission wavelength of these phosphors does not change appreciably as can be seen in FIG. 9 with y=0.02 and z=0.04, however the emission intensity decreases with increasing nitride. The excitation spectrum, as shown in FIG. 10 with y=0.02, z=0.04 and x=0.04, is shifted toward longer wavelengths, that is, toward the red region of the electromagnetic spectrum, as compared to commercial non-nitride-containing strontium aluminate phosphor co-doped with dysprosium and europium, and they also exhibit stronger absorbance characteristics.

The nitride-containing phosphors show significantly higher charging rates compared to the commercial non-nitride-containing phosphor. As seen in FIG. 11, as the amount of nitride in the matrix increases, the charging rate increases, accordingly. Comparing the fluoride-containing phosphors in FIG. 3 to the nitride-containing phosphors in FIG. 11, the difference in charging rates is significantly higher in the nitride containing phosphors.

Replacing some of the oxygen with fluoride in the blue-green emitting phosphors based on SrAl₂O₇:Eu,Dy and Sr₄Al₁₄O₂₅:Eu,Dy give new phosphors that can be represented by Formula IV and V, respectively.

$$Sr_{(1-x-y-z)}Al_4O_{7-x}:Eu_yDy_zxMX_2 \qquad \text{Formula IV}$$

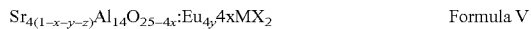

$$Sr_{4(1-x-y-z)}Al_{14}O_{25-4x}:Eu_yDy_z4xMX_2 \qquad \text{Formula V}$$

wherein M=Sr²⁺, Ca²⁺, Ba²⁺
X=F⁻ or Cl⁻
x is between about 0.00001 and about 0.5
y is between about 0.00001 and about 0.2
z is between about 0.00001 and about 0.2

The emission spectra of the phosphor represented in Formula V are shown in FIG. 12 with 4y=0.02 and 4z=0.02. The emission intensity increases significantly with increases in the amount of SrF₂, when 4x<1.20. When 4x=1.20 there is a shift of the emission wavelength to the blue region of the electromagnetic spectrum with a subsequent reduction in emission intensity. This may result from a change in crystal structure of the phosphor matrix. The excitation spectra of these new phosphors are shown in FIG. 13 and the charging rates are shown in FIG. 14. As can be seen, in both cases, with 4y=0.02 and 4z=0.02, replacing a portion of the oxygen in the phosphor matrix with fluoride anions results in significant increases in the absorption intensities and charging rates, respectively, of the phosphor.

When the phosphors depicted in Formula V were prepared using BaF₂ in place of SrF₂ a slight shift of the emission toward longer wavelength was observed as shown on FIG. 15, while the emission intensity again increasing with increases in the fluoride content. This shift again may be an indication of a dramatic change in the crystal matrix structure of the phosphor. Additionally the blue peak at 410 nm disappears when fluoride increases. The excitation spectra of these phosphors are shown in FIG. 16. As with the SrF₂ prepared phosphors, the BaF₂ prepared phosphors show significant increases in absorption intensity with increase fluoride incorporation.

Using CaF₂ in place of either SrF₂ or BaF₂ in the synthesis of phosphors represented by Formula V gave materials whose emission spectra are shown in FIG. 17. There is a slight shift toward longer wavelength with increasing fluoride as well as a significant increase in the emission intensity.

A comparison of the charging curves of the phosphors represented by Formula V is shown in FIG. 18. When either SrF₂ or BaF₂ is used in the synthesis, significant increases in charging rates are obtained compared to the phosphor with no fluoride incorporation. Using CaF₂ also shows an improvement in the charging rate. Using the chloride analogs of the fluoride salts gives phosphors whose charging rate is also increased over non-chloride containing phosphors but to a lesser extent than the fluoride series.

As has been mentioned, when replacing some of the oxide in the alkaline earth aluminate co-doped with europium and dysprosium matrix with fluoride or chloride or nitride, charge such as extra interstitial anions or oxygen vacancies will be produced. This results in an increase in the decay rate of the photoluminescence of the new phosphors, which is the time it takes to for the afterglow to reach a minimal value. FIG. 19 shows the phosphorescence decay rate curves as a function of time for phosphors represented by Formula I. Increasing amounts of fluoride incorporation into the matrix increases the decay rate of the phosphor, as would happen if an increase in the charge defects occurred. To balance the suspected charge defects and thereby improve the decay rate of the photoluminescence, MgO is substituted for a portion of the Al₂O₄ during the synthesis of the phosphor to give phosphors that can be represented by Formula VI.

$$Sr_{(1-x-y-z)}Al_{2-k}O_{4-1/k-x}:Eu_yDy_zxSrF_2,kMgO \qquad \text{Formula VI}$$

wherein x is between about 0.00001 and about 0.5
y is between about 0.00001 and about 0.2
z is between about 0.00001 and about 0.2
k is between about 0.00001 and about 0.5

As shown in FIG. 20 the phosphorescent persistence recovers with the incorporation of MgO.

Substituting AlN for some of the Al₂O₃ during the synthesis of phosphors represented by Formula I, that is the fluorinated alkaline earth aluminates co-doped with europium and dysprosium, gives phosphors that can be represented by Formula VII.

$$Sr_{(1-x-y-z)}Al_{2-k}O_{4-x-3k/2}:Eu_yDy_zxSr_2,kAlN \qquad \text{Formula VII}$$

wherein x is between about 0.00001 and about 0.5
y is between about 0.00001 and about 0.2
z is between about 0.00001 and about 0.2
k is between about 0.00001 and about 0.5

In these phosphors the charge defects are partially offset by the nitride incorporation and, as can be seen in the decay curves of FIG. 21 the nitride provides for a recovery of the photoluminescent persistence. The charging curves of phosphors represented by Formula VII that contain nitride as well as fluoride are shown in FIG. 22. It should be noted that the charging rates for the combination of fluoride and nitride is higher than either anion alone, suggesting a synergistic relationship (compare FIGS. 3, 11 and 22).

Monovalent cation fluorides were also used in the synthesis of the novel phosphors represented by Formula VIII.

$$Sr_{1-x-y-z}Al_2O_{4-x}:Eu_yDy_zxMF \quad \text{Formula VIII}$$

wherein M=$Li^{+1}$ or $Na^{+1}$
x is between about 0.00001 and about 0.5
y is between about 0.00001 and about 0.2
z is between about 0.00001 and about 0.4

Because the salts are monovalent it is believed that no interstitial charge defects can be produced, theoretically. As shown in FIG. 23, the charging rates of the new phosphors made using the monovalent cation fluorides are increased compared to a commercial non-fluoride containing phosphor. Interestingly the lithium prepared phosphor has a higher charging rate than that of the sodium analog.

The decay rate of lithium fluoride phosphor is shown in FIG. 24 curve (d). As with the divalent fluorides the decay rate is increase with the use of monovalent fluorides in the phosphor. For comparison decay curves for a control strontium aluminate (a), without fluoride, chloride or nitride, are included along with those for the charge compensated phosphors (b and c). Included in FIG. 24 is the decay curve for the blue-green phosphor which contains fluoride. Here the decay rate is very slow compared to the green-emitting strontium aluminate phosphors.

The preparation of the novel phosphors of the present invention involve admixing the various starting materials in a predetermined ratio and pre-sintering them in a furnace, followed by grinding and sintering in the furnace at a higher temperature. A flux, such s $H_3BO_3$ or $B_2O_3$ is used to stimulate the solid chemical reaction. The fluoride and chloride ions can be brought into the phosphor lattice using halides such as $SrF_2$, $SrCl_2$, $CaF_2$, $BaF_2$, $CaCl_2$, or $BaCl_2$ or $LiF$ or $NaF$ by admixing them with the other starting materials to give compounds represented by the Formulae I-VIII.

In all the foregoing photoluminescent phosphors that contain dysprosium, a portion of the dysprosium may be replaced by $Y^{3+}$, $La^{3+}$, $Gd^{3+}$, $Lu^{3+}$, $Ce^{3+}$, $Pr^{3+}$, $Nd^{3+}$, $Sm^{3+}$, $Tb^{3+}$, $Ho^{3+}$, $Er^{3+}$, $Tm^{3+}$, $Yb^{3+}$, $In^{3+}$, and $Bi^{3+}$ as co-dopants.

The phosphors of the present invention are useful as components of paint compositions, coatings and objects used indoors and outdoors. While there are many applications for the inventive phosphors a few examples include pathway markers, pathway lighting, safety signage for wall, stair cases, roadway markings, airport markings, markings in public buildings, outdoor markings, marine items such as boats and buoys, safety gear such as helmets, hard hats and vests, sporting equipment such as balls and other equipment, retroreflective items, fibers, transportation vehicle for conspicuity, search/rescue applications, traffic lane markers, crosswalks, plastic extrusion. Applications of the current invention are not only restricted to those listed here.

EXAMPLES

All chemicals used herein had a minimum purity level of between 98% and 99.99% pure. The starting materials, as described in Tables 1-5 below, were weighed into a weighing dish. (All materials in the tables are listed in grams.) They were ground in a mortar and pestle until well mixed. The ground material was placed in an alumina combustion boat and placed in an oven at around 900° C. in air or in a forming gas mixture of 95% $N_2$ and 5% $H_2$ at a rate of 50 cm³/min for four hours. The material was cooled and ground again in a mortar and pestle. The ground material was placed again in an alumina combustion boat and sintered at around 1350° C. for four hours in the forming gas mixture of 95% $N_2$ and 5% $H_2$ at a rate of 50 cm³/min. The material is cooled and ground to a powder of the desired particle size.

TABLE 1

Preparation of $Sr_{0.94}Eu_{0.02}Dy_{0.04}Al_2O_{4.02-x} \cdot SrF_2$ wherein oxide is partially replaced by fluoride using strontium fluoride in the synthesis.

| EXAMPLE | | $SrCO_3$ | $Al_2O_3$ | $Eu_2O_3$ | $Dy_2O_3$ | $SrF_2$ | $H_3BO_3$ |
|---|---|---|---|---|---|---|---|
| 1 | x = 0.01 | 3.432 | 2.550 | 0.176 | 0.373 | 0.031 | 0.031 |
| 2 | x = 0.02 | 3.395 | 2.550 | 0.176 | 0.373 | 0.062 | 0.031 |
| 3 | x = 0.04 | 3.321 | 2.550 | 0.176 | 0.373 | 0.124 | 0.031 |
| 4 | x = 0.08 | 3.173 | 2.550 | 0.176 | 0.373 | 0.248 | 0.031 |
| 5 | x = 0.12 | 3.026 | 2.550 | 0.176 | 0.373 | 0.372 | 0.031 |
| 6 | x = 0.16 | 2.878 | 2.550 | 0.176 | 0.373 | 0.496 | 0.031 |

TABLE 2

Preparation of $Sr_{0.90}M_{0.04}Eu_{0.02}Dy_{0.04}Al_2O_{4.02-x}F_{0.08}$ wherein oxide is partially replaced by fluoride using barium or calcium fluoride in the synthesis.

| EXAMPLE | | $SrCO_3$ | $Al_2O_3$ | $Eu_2O_3$ | $Dy_2O_3$ | $MF_2$ | $H_3BO_3$ |
|---|---|---|---|---|---|---|---|
| 7 | M = Ca | 3.321 | 2.550 | 0.176 | 0.373 | 0.078 | 0.031 |
| 8 | M = Ba | 3.321 | 2.550 | 0.176 | 0.373 | 0.175 | 0.031 |

TABLE 3

Preparation of $Sr_{0.94-x}Eu_{0.02}Dy_{0.04}Al_2O_{4.02-x}MCl_{2x}$ wherein oxide is partially replaced by chloride using strontium, barium or calcium chloride in the synthesis.

| EXAMPLE | | $SrCO_3$ | $Al_2O_3$ | $Eu_2O_3$ | $Dy_2O_3$ | $MCl_2$ | $H_3BO_3$ |
|---|---|---|---|---|---|---|---|
| 9 | x = 0.04<br>M = Sr | 3.321 | 2.550 | 0.176 | 0.373 | 0.159 | 0.031 |
| 10 | x = 0.08<br>M = Sr | 3.173 | 2.550 | 0.176 | 0.373 | 0.317 | 0.031 |
| 11 | x = 0.12<br>M = Sr | 3.026 | 2.550 | 0.176 | 0.373 | 0.476 | 0.031 |
| 12 | x = 0.04<br>M = Ca | 3.326 | 2.550 | 0.176 | 0.373 | 0.111 | 0.031 |
| 13 | x = 0.04<br>M = Ba | 3.326 | 2.550 | 0.176 | 0.373 | 0.208 | 0.031 |

TABLE 4

Preparation of $Sr_{0.94}Eu_{0.02}Dy_{0.04}Al_2O_{4.02-3k/2}N_k$ wherein oxide is partially replaced by nitride using aluminum nitride in the synthesis.

| EXAMPLE | | $SrCO_3$ | $Al_2O_3$ | $Eu_2O_3$ | $Dy_2O_3$ | AlN | $H_3BO_3$ |
|---|---|---|---|---|---|---|---|
| 14 | k = 0.01 | 3.469 | 2.537 | 0.176 | 0.373 | 0.010 | 0.124 |
| 15 | k = 0.02 | 3.469 | 2.525 | 0.176 | 0.373 | 0.020 | 0.124 |
| 16 | k = 0.03 | 3.469 | 2.512 | 0.176 | 0.373 | 0.030 | 0.124 |
| 17 | k = 0.04 | 3.469 | 2.499 | 0.176 | 0.373 | 0.040 | 0.124 |
| 18 | k = 0.08 | 3.469 | 2.488 | 0.176 | 0.373 | 0.080 | 0.124 |

TABLE 5

Preparation of $Sr_{3.96-4x}Eu_{0.02}Dy_{0.02}Al_{14}O_{25.01-4x} \cdot 4xSrF_2$ wherein oxide is partially replaced by fluoride using strontium fluoride in the synthesis with blue-green phosphor $Sr_4Al_{14}O_{25.01}$:Eu,Dy as base matrix.

| EXAMPLE | | $SrCO_3$ | $Al_2O_3$ | $Eu_2O_3$ | $Dy_2O_3$ | $SrF_2$ | $H_3BO_3$ |
|---|---|---|---|---|---|---|---|
| 19 | 4x = 0.08 | 2.291 | 2.856 | 0.014 | 0.015 | 0.040 | 0.030 |
| 20 | 4x = 0.16 | 2.244 | 2.856 | 0.014 | 0.015 | 0.080 | 0.030 |
| 21 | 4x = 0.32 | 2.149 | 2.856 | 0.014 | 0.015 | 0.161 | 0.030 |
| 22 | 4x = 0.50 | 2.043 | 2.856 | 0.014 | 0.015 | 0.251 | 0.030 |
| 23 | 4x = 1.00 | 1.748 | 2.856 | 0.014 | 0.015 | 0.502 | 0.030 |
| 24 | 4x = 1.20 | 1.630 | 2.856 | 0.014 | 0.015 | 0.603 | 0.030 |

TABLE 6

Preparation of $Sr_{3.96-4x}Ba_{4x}Eu_{0.02}Dy_{0.02}Al_{14}O_{25.01-4x}F_{8x}$ wherein oxide is partially replaced by fluoride using barium fluoride in the synthesis with blue-green phosphor $Sr_4Al_{14}O_{25.01}$:Eu,Dy as base matrix.

| EXAMPLE | | $SrCO_3$ | $Al_2O_3$ | $Eu_2O_3$ | $Dy_2O_3$ | $BaF_2$ | $H_3BO_3$ |
|---|---|---|---|---|---|---|---|
| 25 | 4x = 0.16 | 2.244 | 2.856 | 0.014 | 0.015 | 0.112 | 0.030 |
| 26 | 4x = 0.32 | 2.149 | 2.856 | 0.014 | 0.015 | 0.224 | 0.030 |

TABLE 6-continued

Preparation of $Sr_{3.96-4x}Ba_{4x}Eu_{0.02}Dy_{0.02}Al_{14}O_{25.01-4x}F_{8x}$ wherein oxide is partially replaced by fluoride using barium fluoride in the synthesis with blue-green phosphor $Sr_4Al_{14}O_{25.01}$:Eu,Dy as base matrix.

| EXAMPLE | | $SrCO_3$ | $Al_2O_3$ | $Eu_2O_3$ | $Dy_2O_3$ | $BaF_2$ | $H_3BO_3$ |
|---|---|---|---|---|---|---|---|
| 27 | 4x = 0.50 | 2.043 | 2.856 | 0.014 | 0.015 | 0.351 | 0.030 |
| 28 | 4x = 1.00 | 1.748 | 2.856 | 0.014 | 0.015 | 0.701 | 0.030 |

TABLE 7

Preparation of $Sr_{3.96-4x}Ca_{4x}Eu_{0.02}Dy_{0.02}Al_{14}O_{25.01-4x}F_{8x}$ wherein oxide is partially replaced by fluoride using calcium fluoride in the synthesis with blue-green phosphor $Sr_4Al_{14}O_{25}$:Eu,Dy as base matrix.

| EXAMPLE | | $SrCO_3$ | $Al_2O_3$ | $Eu_2O_3$ | $Dy_2O_3$ | $CaF_2$ | $H_3BO_3$ |
|---|---|---|---|---|---|---|---|
| 29 | 4x = 0.08 | 2.291 | 2.856 | 0.014 | 0.015 | 0.025 | 0.030 |
| 31 | 4x = 0.32 | 2.149 | 2.856 | 0.014 | 0.015 | 0.100 | 0.030 |
| 32 | 4x = 0.50 | 2.043 | 2.856 | 0.014 | 0.015 | 0.156 | 0.030 |
| 33 | 4x = 1.00 | 1.748 | 2.856 | 0.014 | 0.015 | 0.312 | 0.030 |

TABLE 8

Preparation of $Sr_{3.96-4x}M_{4x}Eu_{0.02}Dy_{0.02}Al_{14}O_{25.01-4x}Cl_{8x}$ wherein oxide is partially replaced by chloride using strontium, barium or calcium chloride in the synthesis with blue-green phosphor $Sr_4Al_{14}O_{25}$:Eu,Dy as base matrix.

| EXAMPLE | | $SrCO_3$ | $Al_2O_3$ | $Eu_2O_3$ | $Dy_2O_3$ | $MCl_2$ | $H_3BO_3$ |
|---|---|---|---|---|---|---|---|
| 34 | M = Sr | 2.043 | 2.856 | 0.014 | 0.015 | 0.317 | 0.030 |
| 35 | M = Ca | 2.043 | 2.856 | 0.014 | 0.015 | 0.222 | 0.030 |
| 36 | M = Ba | 2.043 | 2.856 | 0.014 | 0.015 | 0.417 | 0.030 |

TABLE 9

Preparation of $Sr_{0.92}Eu_{0.02}Dy_{0.04}Al_{2-k}Mg_kO_{4-k/2}F_{0.04}$ wherein oxide is partially replaced by fluoride using strontium fluoride in the synthesis and magnesium as a charge compensator.

| EXAMPLE | | $SrCO_3$ | $Al_2O_3$ | $Eu_2O_3$ | $Dy_2O_3$ | $H_3BO_3$ | $SrF_2$ | MgO |
|---|---|---|---|---|---|---|---|---|
| 37 | k = 0.02 | 3.469 | 2.525 | 0.176 | 0.187 | 0.031 | 0.063 | 0.025 |
| 38 | k = 0.03 | 3.395 | 2.512 | 0.176 | 0.187 | 0.031 | 0.063 | 0.038 |

TABLE 10

Preparation of $Sr_{0.90}Eu_{0.02}Dy_{0.04}Al_2O_{3.98-3k/2}N_kF_{0.08}$ wherein oxide is partially replaced by fluoride using strontium fluoride in the synthesis and nitride as a charge compensator.

| EXAMPLE | | $SrCO_3$ | $Al_2O_3$ | $Eu_2O_3$ | $Dy_2O_3$ | $H_3BO_3$ | $SrF_2$ | AlN |
|---|---|---|---|---|---|---|---|---|
| 39 | k = 0.02 | 3.395 | 2.525 | 0.171 | 0.373 | 0.031 | 0.126 | 0.021 |
| 40 | k = 0.03 | 3.395 | 2.512 | 0.171 | 0.373 | 0.031 | 0.126 | 0.032 |

TABLE 11

Preparation of $Sr_{0.92}M_{0.02}Eu_{0.02}Dy_{0.04}Al_2O_4F_{0.02}$ wherein oxide is partially replaced by fluoride using monovalent lithium or sodium fluoride in the synthesis.

| EXAMPLE | | $SrCO_3$ | $Al_2O_3$ | $Eu_2O_3$ | $Dy_2O_3$ | MF | $H_3BO_3$ |
|---|---|---|---|---|---|---|---|
| 41 | m = Li | 3.395 | 2.550 | 0.176 | 0.373 | 0.013 | 0.031 |
| 42 | m = Na | 3.395 | 2.550 | 0.176 | 0.373 | 0.021 | 0.031 |

What is claimed is:

1. A photoluminescent phosphor comprising a matrix represented by the formula:

$$(1-x-y-z)GO \cdot xMX_i \cdot n[(1-k/2)Al_2O_3 \cdot kA] \cdot yEu^{2+}O, zR^{3+}O_{1.5}$$

wherein:
G=Sr or Ca;
M=Li, Na, Ca, Sr, Ba; or their combinations;
$X_i$=F, Cl, or $F_2$, $Cl_2$;
A=MgO or AlN;
R=Dy alone or in combination with one or more of Y, La, Ce, Pr, Nd, Sm, Gd, Tb, Ho, Er, Tm, Yb, and Lu or their combinations;
x=0.00001 to 0.4;
y=0.00001 to 0.10;
z=0.00001 to 0.10;
n=1 to 3; and
k=0.00001 to 0.10;

2. The photoluminescent phosphor of claim 1, wherein n=1, and the matrix is represented by the formula:

$$G_{1-x-y-z}(MX_i)_xAl_{2-k}O_{4-x-1.5k+0.5z}A_k:Eu^{2+}_y,R^{3+}_z.$$

3. The photoluminescent phosphor of claim 1, wherein n=2, and the matrix is represented by the formula:

$$G_{1-x-y-z}(MX_i)_xAl_{4-2k}O_{7-x-3k+0.5z}A_{2k}:Eu^{2+}_y,R^{3+}_z.$$

4. The photoluminescent phosphor of claim 1, wherein n=1.75 and 4n=7, and the matrix is represented by the formula:

$$G_{4(1-x-y-z)}(MX_i)_{4x}Al_{14-7k}O_{25-4x-10.5k+2z}A_{7k}:Eu^{2+}_{4y},R^{3+}_{4z}.$$

5. The photoluminescent phosphor of any one of claims 1, 2, 3, or 4, wherein $MX_i$ is chosen from $SrF_2$, $SrCl_2$, $CaF_2$, $CaCl_2$, $BaF_2$, $BaCl_2$, LiF, or NaF or combinations thereof and A is chosen from MgO or AlN or combinations thereof.

* * * * *

UNITED STATES PATENT AND TRADEMARK OFFICE
CERTIFICATE OF CORRECTION

PATENT NO. : 8,329,061 B2
APPLICATION NO. : 12/503211
DATED : December 11, 2012
INVENTOR(S) : Weiyi Jia It is certified that error appears in the above-identified patent and that said Letters Patent is hereby corrected as shown below:

In Col. 13, line 20 (Claim 1), "$X_i$=F, Cl, or $F_2$, $Cl_2$" should read -- $X_i$=F, Cl, $F_2$, or $Cl_2$ --

In Col. 14, line 5 (Claim 1), "k=0.00001 to 0.10;" should read -- k=0.00001 to 0.10. --

Signed and Sealed this
Twenty-second Day of January, 2013

David J. Kappos
*Director of the United States Patent and Trademark Office*